UNITED STATES PATENT OFFICE.

WILLIAM MARTIEN, OF BALTIMORE, MARYLAND, ASSIGNOR TO GEORGE O. MANNING AND JOSHUA LEVERING, TRUSTEES, OF SAME PLACE.

ADHESIVE CEMENT FOR UNITING VENEERS AND OTHER FABRICS.

SPECIFICATION forming part of Letters Patent No. 259,181, dated June 6, 1882.

Application filed November 3, 1881. (No specimens.)

*To all whom it may concern:*

Be it known that I, WILLIAM MARTIEN, of Baltimore, State of Maryland, have invented certain new and useful Improvements in Cements; and I hereby declare the same to be fully, clearly, and exactly described, as follows:

My invention relates to cements for securing various substances together; but it is more especially adapted, by reason of certain qualities it possesses, for use in the manufacture of articles of composite veneer—such, for instance, as are described in patents to R. S. Jennings of February 15, March 25, April 5, and May 24, 1881. For such purposes a cement must be strong and tough, and not liable to become soft in warm nor brittle in cold weather, and I have found the composition about to be described to answer admirably.

In practice I take crude rosin (known to the trade as "yellow-dip") and thoroughly incorporate it, by melting and stirring, with tar in about the proportions of seven parts of the former to one of the latter. Should greater toughness be desired, a quantity of cheap varnish, molasses, or boiled oil may be added, and if greater adhesiveness a small portion of ordinary glue.

To apply the cement it is simply heated until quite fluid, when one or both of the surfaces to be united are coated with the cement by means of a brush. The surfaces are then pressed together and held in contact until the cement sets and cools, when they will be found to be firmly united.

The peculiar nature of the cement admits of the veneer being bent without cracking either the wood or cement, and it leaves nothing to be desired in point of strength.

What I claim is—

The cement herein described, consisting of yellow-dip and tar, with or without diluents, substantially as set forth.

WILLIAM MARTIEN.

Witnesses:
R. D. WILLIAMS,
W. A. BERTRAM.